United States Patent
Peterson et al.

(10) Patent No.: US 6,273,463 B1
(45) Date of Patent: Aug. 14, 2001

(54) AIRBAG VENT VALVE AND SYSTEM

(76) Inventors: Leslie D. Peterson, 862 Glade Dr., Prescott, AZ (US) 86301; Richard E. Zimmermann, 425 E. Greenway Dr., Tempe, AZ (US) 85282

(*) Notice: Subject to any disclaimer, the term of this patent is extended or adjusted under 35 U.S.C. 154(b) by 0 days.

(21) Appl. No.: 09/552,124

(22) Filed: Apr. 19, 2000

(51) Int. Cl.⁷ .................................................. B60R 21/28
(52) U.S. Cl. ...................... 280/739; 137/512.1; 137/857
(58) Field of Search .................... 280/738, 739; 137/852, 855, 857 XC, 899, 351, 524, 512, 512.1 XC (56) References Cited

U.S. PATENT DOCUMENTS

| | | |
|---|---|---|
| 5,219,179 | 6/1993 | Eyrainer et al. . |
| 5,226,670 * | 7/1993 | Wright et al. .................. 280/738 |
| 5,310,215 | 5/1994 | Wallner . |
| 5,489,117 | 2/1996 | Huber . |
| 5,505,485 | 4/1996 | Breed . |
| 5,538,279 | 7/1996 | Link et al. . |
| 5,603,526 | 2/1997 | Buchanan . |
| 5,695,214 | 12/1997 | Faigle et al. . |
| 5,707,078 | 1/1998 | Swanberg et al. . |
| 5,709,405 | 1/1998 | Saderholm et al. . |
| 5,853,192 | 12/1998 | Silkorski et al. . |
| 5,885,064 * | 3/1999 | McCoy .................................. 137/855 |

* cited by examiner

Primary Examiner—Eric Culbreth (57) ABSTRACT

An energy absorbing airbag system includes one or more vent valve assemblies for controlling the release of airbag inflation gases to maintain inflation gas pressure within an airbag at a substantially constant pressure during a ride-down of an energy absorbing event. Each vent valve assembly includes a cantilever spring that is flat in an unstressed condition and that has a free end portion. The cantilever spring is secured to an exterior surface of the airbag housing and flexed to cause the second free end portion of the cantilever spring to be pressed, with a preset force, against a vent port or a closure covering the vent port to seal the vent port until inflation gas pressure within the airbag reaches a preselected value determined by the preset force whereupon the free end portion of the cantilever spring is lifted from the vent port by the inflation gases within the airbag to vent the inflation gases from within the airbag. The resilience of the cantilever spring maintains a substantially constant pressure within the airbag during a ride-down portion of an energy absorbing event by causing the cantilever spring to vent gases through the vent port whenever the pressure of the inflation gases reaches the preselected value and by causing the cantilever spring to close the vent port whenever the pressure of the inflation gases falls below the preselected value.

27 Claims, 5 Drawing Sheets

AIRBAG VENT VALVE AND SYSTEM

The U.S. Government has certain rights with respect to this invention, as provided for by the terms of NASA Contract 99011, dated Dec. 14, 1998.

FIELD OF THE INVENTION

The present invention relates to devices or systems for improving the performance of airbags, and specifically to pressure-control devices that retain and release the inflation gases in a controlled manner and are further capable of quickly venting the gases when necessary.

BACKGROUND OF THE INVENTION

The first airbag systems for automobiles were developed in the 1970's. Since then, airbag systems have saved lives and prevented or reduced serious injury in numerous automobile crashes. Statistically, the effectiveness of airbag systems is without question. The success of airbag systems has also prompted their use in areas other than automobiles. In recent years, airbag systems have been developed for helicopters and general aviation aircraft. Airbags are also being used in various recovery systems, as energy absorbing devices, to reduce the landing impact of aircraft escape capsules, rockets or other space vehicles, and to reduce the landing impact of military cargo drops. Despite several years of development, improvement, and widespread use of airbag systems, problems still remain.

Where airbags are used for vehicle recovery or for cargo drops, problems are primarily related to poor efficiency, and therefore to excessive bag height which can result in payload rollover. In such uses, airbag performance requirements are generally described by the maximum impact force permitted (deceleration) and the mass and velocity of the payload at touchdown. Maximum efficiency is achieved when the system operates at a constant deceleration force slightly less than the maximum permissible deceleration force. This results in the minimum possible distance over which the kinetic energy of the payload can be absorbed.

When airbags are used for vehicle occupant protection, system efficiency is also very important. Of greater concern however, are system performance, reliability and safety considerations. Although a statistically small number, there have been some incidents where the airbag caused severe injury or even death. Many of these incidents have occurred in what is commonly called an out of position situation (OOPS). Simply stated, the occupant is too close to the airbag when the airbag deploys.

Some of the airbag induced injuries are due to crash sensor systems which do not adequately discriminate between crashes and minor impacts.

Some injuries are due to the very aggressive airbag developed in the United States because of requirements for protecting occupants not wearing lap and shoulder belts. The less aggressive airbags developed in Europe, where unbelted occupants are not a design concern, inflict fewer injuries. However, even with perfect sensors and less aggressive airbags, some out of position occupants would still be injured.

Some other airbag induced injuries relate to the wide variation in occupant size and weight. Conventional airbag systems are designed to produce a fixed set of performance parameters, e.g. inflation time, initial pressure, and venting. This set of parameters is intended to protect the widest possible range of occupant sizes. Unfortunately, the system may not provide adequate protection for a very large occupant and conversely, may be injurious to a very small individual.

These cases of airbag injury have attracted considerable media attention, especially when children are involved. This negative publicity has somewhat overshadowed the benefits of airbags, and has caused a fear of airbags among some vehicle owners. Some are even opting to have a lockout switch installed so the airbag system can be completely turned off. Doing so will indeed prevent airbag induced injuries but, unfortunately, the vehicle occupants are also forfeiting any possible benefits of the airbag system.

A unique problem also exists in the present U.S. Army cockpit airbag system (CABS) for Blackhawk, Seahawk, and Kiowa helicopters. These airbag systems are not vented like auto airbag systems are vented. The reason is that the typical crash scenario is much more protracted (e.g. tree strikes prior to ground impact or effects of very rough terrain) so a longer period of bag inflation is required. Therefore, the design and production of the inflator must be very precise to achieve the proper initial pressure. This is particularly difficult to achieve under the temperature extremes in which these helicopters operate. In very cold temperatures, the inflator must provide a certain minimum bag pressure for crew member protection. Unfortunately, in some instances, similar inflators may cause bag ruptures during high temperature use.

Another problem with conventional airbag systems is their size and bulk. This is particularly true of passenger airbag modules. Typical airbags must be larger than their ideal size because of their relatively inefficient fixed vent design. The "oversize" bags then require bulky modules for stowage and increase chances for airbag induce injury.

An ideal airbag system would inflate to a pre-determined pressure, provide an acceptable level of deceleration for the occupant, and maintain that deceleration at a nearly constant value during a crash event. The system would be adjustable to provide the proper deceleration for various size occupants. It would also have the ability to prevent serious injury to any occupant, by venting a large amount of propellant gases very early in the inflation cycle if the occupant is too close to the airbag. In contrast, a typical automotive airbag module only has nonadjustable vents in the airbag fabric. This conventional approach of "one size fits all", presents obvious compromises relative to occupant size and crash situation. Also, having vents in the airbag fabric requires that the airbag must unfold before any gas flow can reach the vents. In a very close OOPS, all of the inflation gases are confined in the airbag module creating a very high pressure, and therefore, a potentially hazardous force on the occupant.

The high media publicity focused on these problems (especially those in the public domain) has prompted numerous proposed solutions. Many of these proposed solutions address a "depowered" airbag, which will deploy with less velocity. This approach can reduce the incidence and severity of airbag induced injuries in minor crashes, but may also compromise the performance of the airbag system in severe crashes.

In proper system operation, the airbag inflates before the occupant enters the area that will be occupied by the airbag. A design rule of thumb, that has appeared in the literature over the years, is that the airbag must be fully deployed before the occupant has moved forward (due to crash acceleration) more than 5 inches from the normal sitting position. Some crash sensors perform this calculation and do not fire the inflator if the criterion is not met. While this prevents possible airbag induced injury, it follows that any benefit that might have been provided by the airbag has also been defeated.

Other proposals include a great variety of sensors intended to detect the size and position of seat occupants (especially the passenger) and microprocessor circuitry programmed with appropriate logic to control airbag deployment. Depending on the specific crash situation, these "smart airbag systems" may deploy using the full power of dual inflators, deploy with less force by using only one inflator, or not deploy at all. Again, if the system does not deploy, any possible benefit during a crash event has been forfeited.

Considerable research on improving the efficiency of cargo drop airbag systems has been conducted or sponsored by U.S. Army Soldier Systems Command, Natick, Mass. Numerous studies have been conducted with airbags having fixed exhaust vents. Studies have been conducted with various auxiliary devices. One such system involved injecting compressed air into an airbag while the airbag was being compressed. Another system, described in ASME Paper No. 091-WA-DE-1, uses a servo-controlled, mechanical sliding vent closure to affect greater system efficiency. A recent research program conducted by Warrick and Associates Inc. (ref. U.S. Army Soldier Systems Command, Natick, Mass., Contract No. DAAK-97-C-9204) has also demonstrated the efficiency advantages of maintaining a constant "ride-down" pressure in a cargo-drop airbag system. That system utilizes a pneumatic pilot-pressure feed back loop with flexible diaphragm valving. Although the size and complexity of such systems are not appropriate for personnel protection in passenger vehicles, the concept of using venting control to improve airbag efficiency has been clearly validated.

SAE Technical Paper Series Number 980646, "An Innovative Approach to Adaptive Airbag Modules" by Ryan, describes a valve developed to control the gas going into the airbag rather than controlling the gas exiting the airbag. Depending upon crash severity determinations made by the crash sensor, some gas may be diverted at the time of airbag inflation.

U.S. Pat. No. 5,219,179 to Eyrainer describes airbag valves which are essentially burst discs. These valves simply open at a pressure which is selected at the time of design. After opening, these valves function as fixed vents much the same as conventional airbags.

U.S. Pat. No. 5,310,215 to Walner shows conventional fixed vents overlying deflectors to minimize injury to the occupant. There is no provision for maintaining constant pressure.

U.S. Pat. No. 5,489,117 to Huber shows reed valves designed to operate at a very low pressure, and these valves are used to allow aspiration of ambient air during the inflation process. Although vent control is disclosed, the vent valves are designed to provide only two levels of fixed vent area and have no provision for maintaining a constant pressure.

U.S. Pat. No. 5,505,485 to Breed shows a spring-biased cover as " . . . vent means . . . for deflating said airbag". There is no mention of the cover's purpose being other than a means of quickly venting the "excess" gases. There is no specific mention of controlled venting, and indeed, it seems obvious that the cover could not serve such a purpose. The spring tabs shown would have a spring constant much too high. It appears that the cover simply remains closed, until the selected pressure is reached, and then, swings open, bending the "spring" tabs with it. Also of importance is the fixed nature of the cover. The cover is not adjustable in any way to vary the pressure for different occupant sizes.

U.S. Pat. No. 5,538,279 to Link et al shows a fixed vent (or vents) initially closed by a cover flap. The text repeatedly states that the cover will only open the vent port(s) after a pre-determined pressure is reached, but there is no attempt to explain how that occurs. It appears that the cover flap does little more than aerially distribute and re-direct the exhaust gases.

U.S. Pat. No. 5,603,526 to Buchanan shows fixed vents in the bag fabric, which are initially closed by frangible coverings. Functionally, this is very similar to the Eyrainer patent, previously referenced, and is apparently unique only in detail construction.

U.S. Pat. No. 5,695,214 to Faigle et al shows various methods of pre-selecting different fixed vent openings. Several devices are shown, including hinged doors, deformable doors, and explosive rivets or bolt releases. In all cases, once a vent-area setting has been selected, the vent area remains constant throughout system operation regardless of pressure.

U.S. Pat. No. 5,707,078 to Swanberg et al shows a mechanical valving system that pre-selects exhaust vent area, and simultaneously selects flow area from the inflator into the bag. As with the Faigle patent above, once the vent area is selected, the vent area remains constant throughout system operation.

U.S. Pat. No. 5,709,405 to Saderholm et al shows another mechanical means of pre-selecting flow area to control mass flow into the bag.

U.S. Pat. No. 5,853,192 to Silkorski et al shows yet another means of pre-selecting vent area with hinged doors and latches.

Although their purposes are stated somewhat differently, these last four patents, to Faigle, Swanberg, Saderholm and Silkorski, all do essentially the same thing. Their pre-set vents act as proportioning devices, wherein a portion of the inflation gases is directed toward the airbag while the remainder is directed to atmosphere. In all of these cases, where vent area is pre-selected as a result of various sensors, the areas selected are based on a presumed or anticipated inflator output. Even if it were possible to perfectly measure the critical variables and correctly discriminate the crash conditions, system performance would be vulnerable to inflator variations because no means of actual pressure control is provided. Elimination of inflator-specific variations is virtually impossible because of manufacturing tolerances and the effects of variable environmental conditions.

SUMMARY OF THE INVENTION

The present invention is a flat cantilever vent valve system for significantly improving airbag performance. Individual vent valve units, located on the outside of an airbag module, provide the necessary total vent area to controllably release inflation gases following deployment of the airbag. The vent valves are normally closed, and are preset to open only at a pre-determined pressure (a venting pressure). Preferably, this preset venting pressure is adjustable and is preset according to the occupant size. In a crash event, a crash sensor triggers ignition of the inflator; the airbag module cover is forced open; and the airbag inflates. During this process, the vent valves retain inflation gases until the airbag fully inflates. Impact of the occupant into the airbag (due to crash acceleration) compresses the airbag causing the internal airbag pressure to rise. As the pressure of the gases within the airbag exceeds the preset venting pressure value of the vent valves, the vent valves open to release the inflation gases. Conversely, as the forward motion of the occupant slows, due to deceleration, the displacement rate slows and the vent valves close as the decreasing pressure of the gases within the airbag approaches the preset venting pressure value of the vent valves.

There are two primary advantages to the operation just described. First, the ability of the vent valves to relieve pressure within an airbag above a preset limit protects the occupant from excessive and potentially injurious deceleration during a crash. Secondly, maintaining a relatively constant pressure throughout ride-down provides a higher degree of energy absorption efficiency than with a conventional airbag system. This higher efficiency results in a shorter ride-down distance to absorb the energy of a given crash event. Therefore, for a given degree of protection, a smaller airbag can be used with the system of the present invention than would be required for a conventional airbag system or, in other words, with this higher efficiency, the use of a conventional size airbag in the system of the present invention would provide protection in more severe crashes than with present airbag systems.

Another advantage of the preferred vent valve system of the present invention is its adjustability for occupant size. For any given airbag system and crash situation, it takes more force (and therefore higher pressure) to stop a large occupant at an acceptable level of deceleration than it does for a small occupant. The adjustment feature of the present preferred vent valve system allows the airbag to function at similar efficiencies in both cases.

A further significant advantage of the vent valve system of the present invention is the ability of the vent valve system to protect the occupant during an OOPS. As mentioned above, the vent valves open when subjected to inflation gas pressures above the vent valves' preset venting pressure value. Since the vent valves are located in the airbag housing near the inflator, the vent valves are available for venting immediately in the inflation cycle. This is especially advantageous in the case of a severe OOPS (occupant very close to the airbag module). Whatever the position of the occupant, if the airbag attempts to deploy but strikes the occupant, the resulting resistance will cause the inflation pressure to rise to the preset valve venting pressure level. The vent valves will open and vent the excess gases, thus, minimizing the force on the occupant.

A further advantage of the vent valve system of the present invention is its simplicity and flexibility. In the preferred embodiment of the invention, individual valve assemblies can be attached to the outside of various sizes and shapes of airbag modules. The parts themselves, utilize common materials, and can be easily produced using conventional manufacturing equipment and processes. Vent valve size can be easily adapted to a particular airbag application. Depending on the physical limitations of an installation, a small number of larger vent valves could be used, or conversely, a larger number of smaller vent valves could be used.

DESCRIPTION OF THE PREFERRED EMBODIMENTS

Figures 1A, 1B:
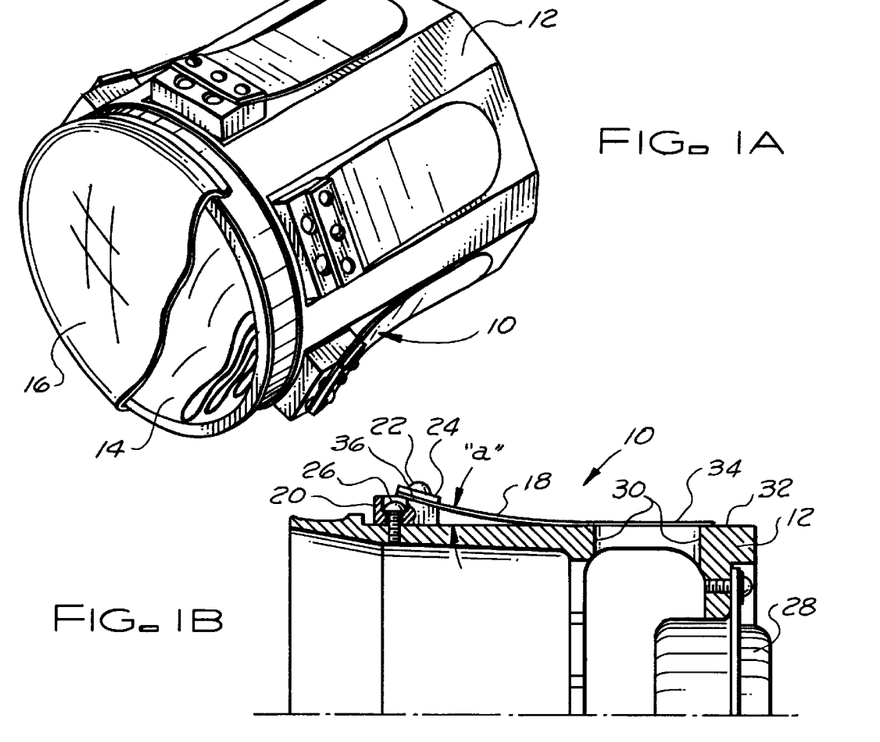
FIG. 1A is an isometric view of a generic airbag module having a plurality of simple, flat cantilever vent valves, wherein the valves are not adjustable. The module cover is partially cut away to show a stowed airbag.
FIG. 1B is a partial cross-section view of the module of FIG. 1A, and shows a single flat cantilever vent valve mounted on the module housing. The airbag and module cover are not shown.

Referring now to the figures, FIG. 1A illustrates a generic airbag module, having a plurality of flat cantilever vent valves 10 mounted on a housing 12. Other module components shown in this view include an airbag 14 and a partially cut away cover 16.

FIG. 1B is a partial cross section view of the module in FIG. 1A, and is taken through the centerline of a single vent valve 10 (the airbag 14 and the cover 16 are omitted from this view). The flat cantilever spring 18 of the vent valve 10 is secured to a mounting block 20 by screws 22 and a backing plate 24. The cantilever spring/mounting block assembly is attached to the airbag housing 12 with machine screws 26. A conventional airbag inflator 28 is shown installed in the housing 12 for reference purposes. The vent valve 10 is positioned such that, when the vent valve is closed, the cantilever spring 18 of the vent valve completely covers and seals a vent port 30.

The preferred material for the cantilever spring 18 is 17-7 Precipitation Hardening Stainless steel, heat-treated to a tensile strength of approximately 300,000 pounds per square inch. Although other materials can be used for the cantilever spring 18, 17-7 was chosen for its high strength, excellent spring properties (its flexibility and resilience or its ability to undergo flexure when subjected to a force and recover its original shape when released from the force), and corrosion resistance. The specific material used to make the mounting block 20 is not critical. However, in the interest of maintaining a reasonably low weight for the overall valve assembly, an aluminum alloy is preferred. If the mounting block 20 is made from aluminum, the surfaces of the aluminum must be anodized, or otherwise treated, to prevent galvanic corrosion between the mounting block 20 and the cantilever spring 18.

In principle, the airbag system could use one of several types of relief valves, for example, a spring loaded poppet valve. However, an important advantage of the present invention is the fast response time of the vent valve 10 due to the cantilever spring's relatively low mass, flexibility and resilience. The total airbag ride-down time during a crash is typically less than 100 milliseconds. A spring-loaded poppet valve or similar valve, in combination with the relatively low pressures involved, would take far too long to respond to pressure changes because of its mass and the associated acceleration time to open or close. Mathematical approximation and test verification with the cantilever spring 18 of the vent valve 10 has indicated that the response time of the vent valve 10, with a differential of one pound per square inch, is less than 5 milliseconds.

As manufactured, cantilever spring 18 of the vent valve 10 is a flat part having a width greater than the width of the vent port 30 and a length which enables the cantilever spring 18 to be secured to and extend from the mounting block 20 to a location is beyond the vent port 30. The surface 32 surrounding the outer end of the vent port 30, with which the underside of the free end portion 34 of the cantilever spring 18 forms a seal when the vent valve 10 is closed, is flat or planar to conform the underside of the cantilever spring 18. The spring mounting surface 36 of the mounting block 20 is angled with respect to the flat or planar surface 32 adjacent the vent port 30 at an acute angle "a" to orient the underside of the cantilever spring 18, where the cantilever spring 18 extends beyond the mounting surface 36, at the desired acute angle "a" to the flat or planar surface 32 surrounding the vent port 30. The spring mounting surface 36 of the mounting block 20 is of a proper height and spacing from the vent port 30 to cause, with the angle "a" of orientation of the underside of the cantilever spring 18, the desired deflection of the cantilever spring 18 at the vent port 30 to set the venting pressure of the vent valve 10 at a desired preset pressure level or value. In other words, the desired deflection of the cantilever spring 18 at the vent port 30 is a function of the required preset venting pressure for a given airbag system. Although there are many permutations of the possible variables (e.g., spring length, spring thickness, vent port diameter, preset venting pressure, etc.) a simplified example follows for illustration purposes.

In establishing a venting pressure setting for the vent valve 10 and the other vent valve embodiments of the present invention, it is first necessary to define the circumstances for which the setting is to be used. In general, effective body mass and airbag configuration are the two main factors to be considered. For an occupant wearing a seat belt, it is common practice to assume that the effective weight (upper torso weight), to be decelerated by the airbag 14, is approximately 30% of the total occupant weight. It is also common practice to assume an effective airbag area to be approximately 200 square inches. A 16-inch diameter airbag is approximately this size. Typically, conventional airbags have an overall diameter larger than 16 inches, and are internally tethered to form a somewhat flattened pillow. However, studies have shown that the average effective area of the occupant contacting the bag is also approximately 200 square inches. If a diameter smaller than 16 inches were to be used for the airbag, the area would have to be calculated for that diameter. Otherwise, an effective area of 200 square inches is used. Also, numerous studies have been conducted to determine injury criteria due to acceleration (or deceleration) on the human body. Even though the apparent limits of such studies may vary due to variable circumstances, it is commonly known that deceleration in the 10 G to 15 G range, in an airbag system, are well within the limits of human tolerance. Therefore, assuming a nominal weight of 60 pounds (the effective weight of an upper torso for a 180 pound adult wearing a seat belt), and a desired deceleration of 15 G provided by the airbag, it follows that the airbag must provide 900 pounds of resistance during ride-down. Further assuming that the effective area of the occupant displacing the airbag is 200 square inches, the internal airbag pressure must be 4.5 pounds per square inch (psi) to create the 900 pounds of ride-down resistance. Therefore, the desired preset venting pressure for the vent valve 10 and other embodiments of the vent valve of the present invention, for a seat belted adult weighing about 180 pounds, is approximately 4.5 psi.

To determine the load and deflection characteristics of the cantilever spring 18, it is necessary to consider the area of the cantilever spring 18 that is exposed to the desired preset venting pressure. Again referring to FIG. 1B, if the vent port 30 is assumed to have a diameter of 1¼ inches, its equivalent area is 1.227 square inches. A desired preset venting pressure of 4.5 psi, acting on an area of 1.227 square inches, creates a load of approximately 5½ pounds. Preferably, the cantilever spring 18 is of a constant width and thickness, and acts as a simple cantilever beam. The cantilever spring mounting surface 36 of the mounting block 20 is then established at a height and angle "a" such that, with a 5½ pound load, the surface surrounding the vent port 30 (the vent port surface) becomes tangent to the natural curvature of the underside of the cantilever spring 18 slightly short of the edge of the vent port 30 nearest the mounting block 20. The remaining free portion 34 of the cantilever spring 18 (from the tangent point to its free end) lies flat on the vent port surface 32 and extends beyond the lateral edges and the far edge of the vent port 30 to seal the vent port 30 until the preset venting pressure is reached. Once the pressure within the airbag 14 reaches or exceeds the preset venting pressure, the free end portion 34 of the cantilever spring 18 lifts off of the vent port surface 32 (the vent valve 10 opens) and allows the inflation gases to escape through the vent port 30 from the airbag 14 until the pressure within the airbag 14 again drops below the preset venting pressure whereupon the free end portion 34 of the cantilever spring 18 returns to rest on the vent port surface 32 to again seal the vent port 30. For the parameters just described, a 17-7 Stainless Steel flat cantilever spring 18 having a width of 1½ inches, an operating length (from the edge of the mounting block mounting surface 36 to the center of the vent port 30) of 2½ inches, and a thickness of 0.025 inches, can serve the intended purpose. Even though there are many detail configurations possible, the engineering calculations required are straightforward in accordance with common practice, and can be performed by anyone of ordinary skill in the art.

In actual practice, the total vent area required for any particular airbag system is a function of the airbag size, inflator output, and the resulting worst-case mass flow required of the system. That total area is achieved by using a plurality of vent valves 10. In the case of a round airbag housing (a housing having a circular transverse cross section such as the housing 12 of FIG. 1) the vent valves 10 are typically spaced equally around the periphery of the housing if the physical limitations of the installation permit. In the case of a multi-sided airbag housing having four or more sides (a housing having a transverse cross section such as but not limited to a square, rectangular or hexagonal cross section), the vent valves 10 would be placed on one or more of the housing's flat side surfaces.

During a crash event, a crash sensor triggers the airbag inflation process. The vent valves 10 remain closed, retaining the inflation gases, until the airbag 14 fully inflates. As the occupant starts to compress the airbag 14 (due to forward acceleration), the vent valves 10 open when the pressure within the airbag reaches or exceeds the preset venting pressure. If the occupant's forward rate of displacement is great enough to cause a significant pressure increase, the vent valves 10 will open wider venting the gases from within the airbag 14 faster, and still maintain a relatively constant pressure. Conversely, as the occupant decelerates, the rate of forward displacement diminishes, the pressure within the airbag 14 drops and the vent valve 10 will become less open and the gases from within the airbag 14 will vent less quickly. As the pressure within the airbag 14 once again drops below the vent valves' preset venting pressure, the vent valves 10 close and continue to maintain a relatively constant pressure within the airbag 14.

In the case of an OOPS, the pressure within an airbag 14 will rise rapidly when the occupant blocks the deployment of the airbag. The vent valves 10 will immediately open to release the excess inflation gases from the airbag 14 and drop the internal pressure of the airbag 14, thus minimizing potential injury to the occupant.

Figure 2:
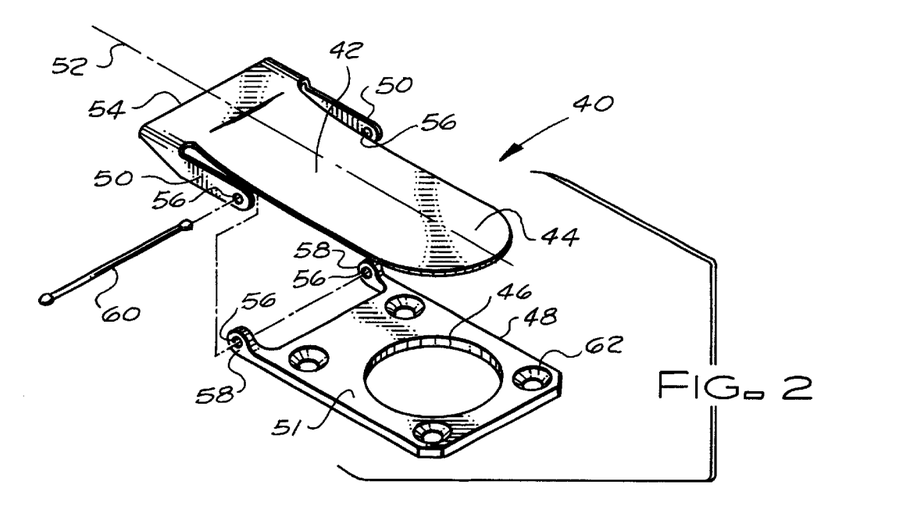
FIG. 2 is an exploded view of an adjustable flat cantilever vent valve.

FIG. 2 shows an embodiment 40 of the vent valve of the present invention which is an independent, adjustable subassembly. As shown, a flat cantilever spring 42 of the vent valve 40 is a formed stamping having a flat free end portion 44 (like the free end portion 34 of cantilever spring 18) for overlaying, completely covering, and sealing a vent port 46 in a valve base 48 of the subassembly and a pair of lateral arms 50 depending from either side of the flat cantilever spring 42 for mounting the cantilever spring 42 on the valve base 48. As with the cantilever spring 18, the free end portion 44 of the cantilever spring 42 extends from where the vent port surface 51 surrounding the vent port 46 in the valve base 48 becomes tangent to the underside of the cantilever spring 42 to the free end of the cantilever spring. The lateral arms 50 extend parallel or generally parallel to a longitudinal centerline 52 of the cantilever spring 42 from an opposite end or adjacent an opposite end 54 of the cantilever spring 42 toward the free end portion 44 of the cantilever spring 42. Aligned holes 56 in the free ends of the arms 50 and the lugs 58 of the valve base 48 accept a pivot pin 60 for mounting the cantilever spring 42 on the valve base 48 so that the cantilever spring 42 pivots about an axis: a) oriented perpendicular to the longitudinal centerline 52 of the cantilever spring 42 and parallel to planes containing the major upper and lower surfaces of the cantilever spring, and b) located intermediate the free end portion 44 and the opposite end 54 of the cantilever spring 42. The pivot pin 60 is held in place by flattening the ends of the pin after assembly, or by any other acceptable retention means.

As with the flat-form cantilever spring 18 of FIG. 1B, the preferred material for the formed spring 42 is 17-7 Precipitation Hardening Stainless Steel, heat-treated to a tensile strength of approximately 300.000 psi. The material of the valve base 48 is not critical, but in the interest of minimal weight and reasonable strength, machine-grade aluminum such as 6061-T6 is preferred. The pivot pin 60 should be a high strength stainless or alloy steel. Whatever the materials, appropriate surface treatments must be applied to prevent galvanic corrosion. The valve base 48 is shown with countersunk holes 62 for assembly to an airbag housing with flat head screws. When mounted on an airbag housing, the vent port 46 in valve base 48 is centered over the vent port in the airbag housing, such as the vent port 30 in the airbag housing 12, and becomes outer or external end of airbag housing vent port. Various attachment methods, other than screws, could be used equally as well to attach the valve base to an airbag housing, such as but not limited to riveting, clamping, welding, etc.

Figure 3:
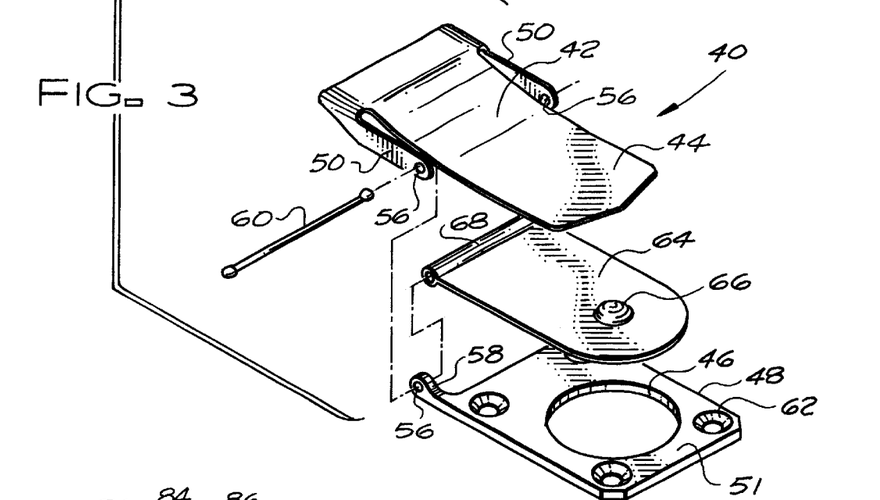
FIG. 3 is an exploded view of an adjustable flat cantilever vent valve that also includes an intermediate member to enhance preset venting pressure accuracy.

During inflation, the tip of the valve spring 42 will start to rise slightly, allowing some leakage before the vent valve 40 actually opens at its preset venting pressure. In use, where the airbag is filled with a high volumetric rate of flow produced by the inflator, a perfect seal is not essential for proper system performance. However, minimizing leakage in the pre-loaded position will minimize inflator performance requirements and thereby contribute to reductions in size and weight. FIG. 3 shows a method of preventing this initial leakage, thus improving the efficiency of the basic vent valve 40 of FIG. 2. The vent valve subassembly 40 shown in FIG. 3 is much the same as that illustrated in FIG. 2, except, an intermediate valve seal 64 has been added between the cantilever spring 42 and the vent port 46 in the valve base 48 to serve as the primary valve closure. The intermediate valve seal 64 overlays, completely covers, and seals the vent port 46 when the vent valve is closed. The cantilever spring 42 of FIG. 3 is the same as the cantilever spring 42 of FIG. 2, except, with the intermediate valve seal 64, a full radius end is no longer required and the cantilever spring need only be long enough to engage a dimple-like projection 66 on the valve seal 64. A tubular section 68 is formed on one end of the valve seal 64 to provide an attachment to the pivot pin 60. The dimple-like projection 66 of the valve seal 64 is centered with respect to the vent port 46 and projects toward the underside of the free end portion 44 of the cantilever spring 42. The projection 66 provides a central, constant pressure point so that the valve seal 64 will always lie flat. Now during airbag inflation, the valve seal 64 remains flat and keeps the vent port 46 closed until the load, due to the inflation pressure on the valve seal 64, overcomes the preset venting pressure or load of the cantilever spring 42. The valve seal 64 is also a stainless steel part, but need not have the high strength or spring characteristics of the cantilever spring 42. Therefore, a 300 Series Stainless Steel will suffice.

Figures 4A, 4B:
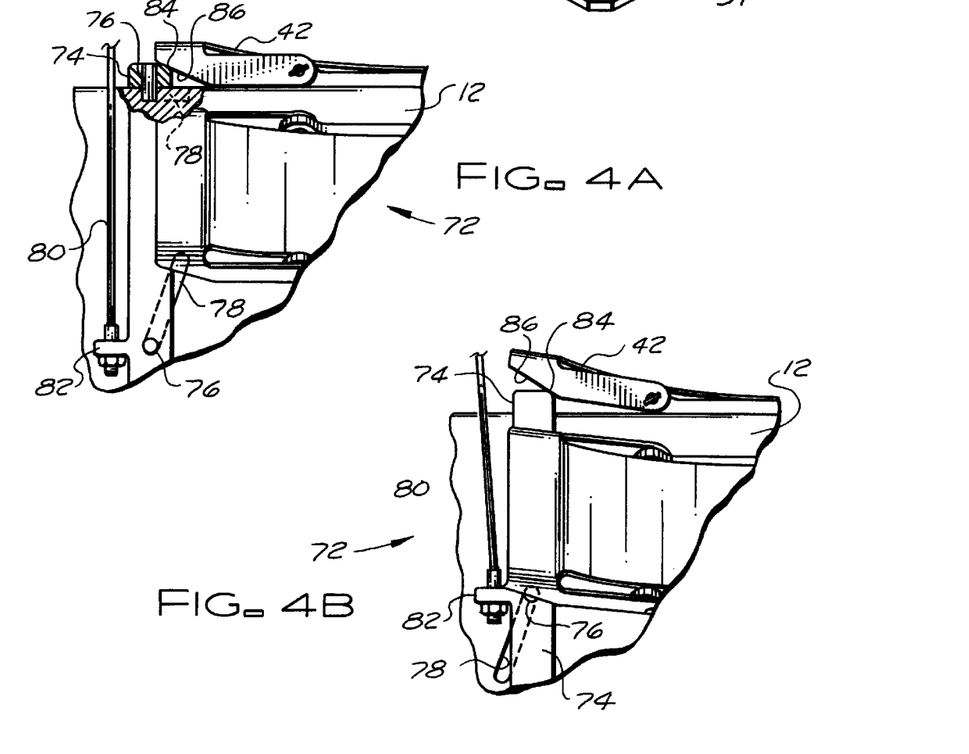
FIG. 4A is a partial cutaway view of an adjustment mechanism for adjusting the preset venting pressure of a flat cantilever vent valve that can be used on round airbag modules. The adjustment mechanism is shown in its lowest pressure setting position.
FIG. 4B shows the adjustment mechanism of FIG. 4A in its highest pressure setting position.
Figure 4C:
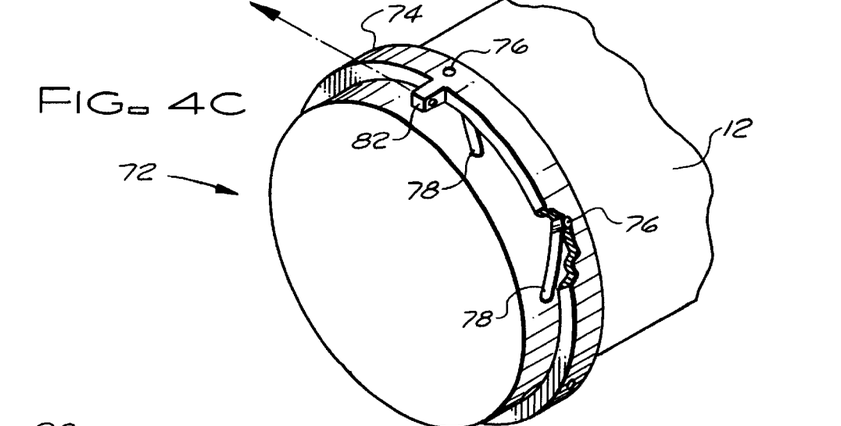
FIG. 4C is a partial isometric view of an airbag module, shown to further illustrate the function of the cam ring shown in FIGS. 4A and 4B. The vent valves, as well as other details are not shown.

FIGS. 4A–4C show a mechanism 72 for preset venting pressure adjustment that can be applied to the vent valve 40 of FIGS. 2 and 3, if the airbag housing is a round housing, such as the airbag housing 12 of FIG. 1. FIG. 4A shows the adjustment mechanism 72 in the lowest preset venting pressure setting, while FIG. 4B shows the adjustment mechanism 72 in the highest preset venting pressure setting. The adjustment mechanism 72 includes a cam ring 74 which is slip-fitted to the housing 12 and held in position by a plurality of guide pins 76 located in angled slots 78. The guide pins 76 are permanently affixed to the cam ring 74, but are free to move in the slots 78. As shown by the arrow in FIG. 4C, a pulling action applied to a control cable 80 which is attached to a lug 82 of the cam ring 74, rotates cam ring 74 in a counterclockwise direction and causes axial translation of the cam ring 74 toward the vent valves 40 mounted on the airbag housing 12 as the cam ring follows the slots 78. As shown in FIGS. 4A and 4B, a surface 84 of the cam ring 74 is engaged with and maintains contact with inclined edges 86 of the mounting arms 50 of the cantilever spring 42 of each vent valve 40 intermediate the axis of the pivot pin 60 and the end 54 of the cantilever spring. As the cam ring 74 is rotated counterclockwise and moves toward the vent valve 40, the cam ring 74, through its contact with the inclined edges 86 of the mounting arms 50, forces the end 54 of the cantilever spring 42 of the vent valve upward and increases the deflection of the cantilever spring 42 from the deflection shown in FIG. 4A. This increases the pre-load force or preset force on the cantilever spring 42 of the vent valve 40 and raises the pressure required to open the vent valve 40 (raises the preset venting pressure). Conversely, when the cam ring 74 is rotated clockwise and moves away from the vent valves 40, the movement of the cam ring 74 away from the vent valves 40 permits the end 54 of the resilient cantilever spring 42 of each vent valve to move downward toward the position shown in FIG. 4A and decreases the deflection of the cantilever spring 42. This decreases the pre-load force or preset force on the cantilever spring 42 and lowers the pressure required to open the vent valve 40 (lowers the preset venting pressure).

Although FIGS. 4A–4C illustrate a control cable 80 for the actuation means, many methods are possible depending upon the requirements of a specific installation. For example, in general aviation aircraft, a manual control can be mounted on the instrument panel and connected to the airbag module 12 by way of a rod, simple linkage or lever mechanism. A weight scale beside the control lever would indicate approximate occupant weight ranges. Making the proper setting can be an item on the pilot's pre-flight checklist. In the much less disciplined automotive operating environment, automatic adjustment would be almost mandatory. In that application, the adjustment mechanism would be servo-driven and controlled by a sensor device similar to those used in some current airbag systems.

Figure 5A:
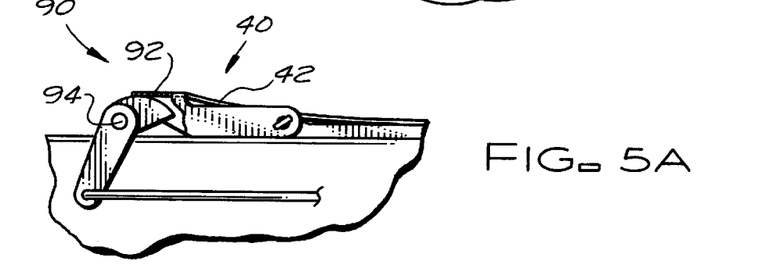
FIG. 5A shows an adjustment mechanism, for adjusting the preset venting pressure, which may be used when the vent valves are installed on a square or rectangular airbag module. The adjustment mechanism is shown in its lowest pressure setting position.
Figure 5B:
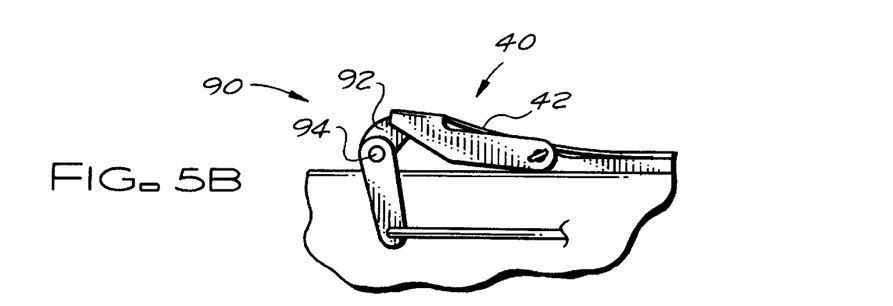
FIG. 5B is the adjustment mechanism of FIG. 5A, shown in its highest pressure setting position.

FIGS. 5A and 5B show an alternate adjustment mechanism 90 that can be used on a square or rectangular airbag housing to adjust the preset venting pressures of the valves 40 of FIGS. 2 and 3. The adjustment mechanism 90 performs the same function as the adjustment mechanism 72 shown in FIGS. 4A–4C, except, this adjustment mechanism 90 uses a plurality of cams 92 mounted on a camshaft 94 to adjust the preset venting pressure of each vent valve 40. FIG. 5A illustrates the adjustment mechanism 90 at its the lowest venting pressure setting while FIG. 5B illustrates the adjustment mechanism 90 at its highest venting pressure setting. As shown in FIGS. 5A and 5B, each cam 92 engages an underside of the cantilever spring 42 of a vent valve 40 intermediate the axis of the pivot pin 60 and the end 54 of the cantilever spring. As the cam 92 is rotated counterclockwise, the free end of the cam 92 moves upward and, through its contact with the underside of the cantilever spring 42, forces the end 54 of the cantilever spring 42 upward thereby increasing the deflection of the cantilever spring 42 from the deflection shown in FIG. 5A. This increases the pre-load force or preset force on the cantilever spring 42 of each vent valve and raises the pressure required to open the vent valve 40 (raises the preset venting pressure). Conversely, when the cam 92 is rotated clockwise and the free end of the cam moves downward, the downward movement of the cam 92 permits the end 54 of the resilient cantilever spring 42 of each vent valve 40 to move downward toward the position shown in FIG. 5A and decreases the deflection of the cantilever spring 42. This decreases the pre-load force or preset force on the cantilever spring 42 and lowers the pressure required to open the vent valve 40 (lowers the preset venting pressure). Typically, a plurality of vent valves 40 are placed on one or more flat surfaces of an airbag housing. Individual cams 92 on a common camshaft 94 would operate all of the vent valves mounted on a common surface. Control considerations discussed above in connection with the adjustment mechanism 72 of FIGS. 4A–4C also apply to adjustment mechanism 90.

Figure 5C:
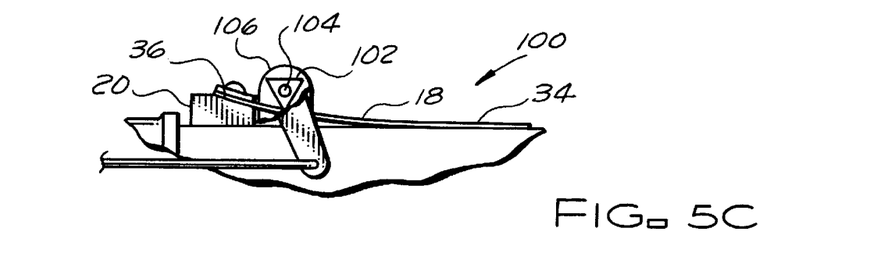
FIG. 5C shows a rotating fulcrum adjustment mechanism for adjusting the preset venting pressure. The fulcrum mechanism is shown applied to a fixed vent valve, such as illustrated in FIG. 1, but can also be applied to adjustable valves such as those illustrated in FIGS. 2 and 3.

FIG. 5C shows an adjustment mechanism 100 for adjusting the preset venting pressure of the vent valves of FIG. 1A, 1B, 2 or 3. While the adjustment mechanism 100 can be used with the vent valves 40 of FIGS. 2 and 3, the adjustment mechanism is shown in use with the vent valve 10 of FIGS. 1A and 1B. The adjustment mechanism 100 includes an adjustable fulcrum device 102 which acts as a cam to press down on the upper surface of the cantilever spring 18 intermediate the cantilever spring mounting surface 36 of the mounting block 20 and the free end portion 34 of the cantilever spring 18. As the fulcrum device 102 is rotated to press downward on the upper surface of the cantilever spring 18 with more force, the preset venting pressure of the vent valve 10 is increased due to greater cantilever spring deflection. As the fulcrum device 102 is rotated to press downward on the upper surface of the cantilever spring 18 with less force, the preset venting pressure of the vent valve 10 is decreased due to lower cantilever spring deflection. The fulcrum device 102 can also be used on the vent valves 40 by locating the fulcrum device 102 to press down on the upper surface of the cantilever spring 42 intermediate the axis of the pivot pin 60 and the free end portion 44 of the cantilever spring 42. As the fulcrum device 102 is rotated to press downward on the upper surface of the cantilever spring 42 with more force, the preset venting pressure of the vent valve 40 is increased due to greater cantilever spring deflection. As the fulcrum device 102 is rotated to press downward on the upper surface of the cantilever spring 42 with less force, the preset venting pressure of the vent valve 40 is decreased due to lower cantilever spring deflection.

The fulcrum device 102 is mounted on a shaft 104, which is in turn suspended in a bracket or pair of brackets 106 mounted on the module housing. The fulcrum device 102 itself can be of various shapes such as but not limited to triangular, as shown, an elliptical cam, or any other shape that will provide the desired deflection in the cantilever spring 18 or 42.

The above adjustment mechanisms are a few examples of the adjustment mechanisms that can be used to control the preset venting pressures of the vent valves of the present invention. The actual adjustment mechanisms used for a particular application is dependent on the requirements of the particular installation. The cantilever springs themselves can be of various shapes, and can be adjusted in various ways. There may also be circumstances where it is desirable to use the adjustable fulcrum in FIG. 5C in combination with the formed valve spring and adjustment systems in either FIGS. 4A and 4B or 5A and 5B. Once this specification has been read, other devices or combinations of devices might easily be created by anyone of ordinary skill in the art. Of primary importance with regard to the preferred embodiments of the present invention is that the vent valve must be adjustable to provide the proper preset venting pressure for different size occupants.

Figure 6A:
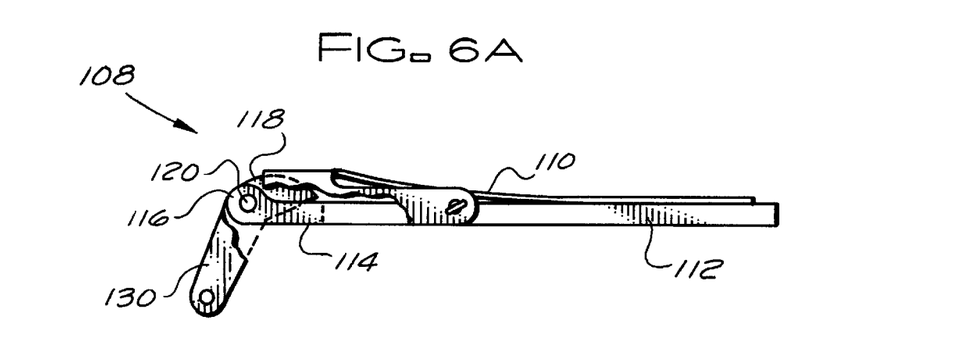
FIG. 6A shows an alternate preferred embodiment of the flat cantilever vent valve, wherein the components can be pre-assembled, calibrated, and furnished as a kit for installation on various airbag modules.
Figure 6B:
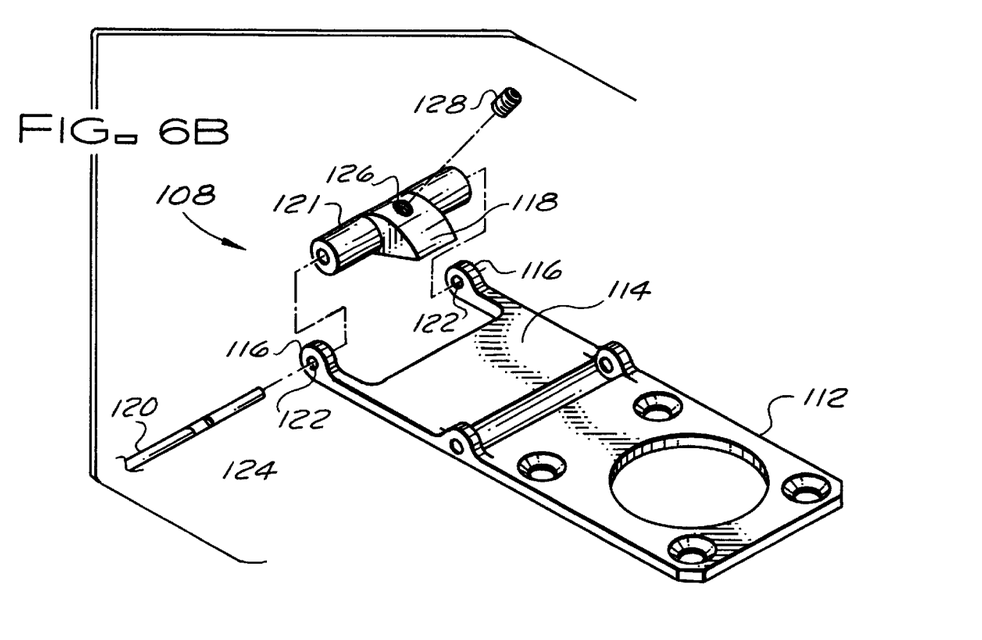
FIG. 6B is an exploded view further illustrating part of the valve shown in FIG. 6A and, specifically, showing the assembly of the actuating cam, which adjusts the preset venting pressure, to the valve base.

FIG. 6A shows another variation 108 of the vent valve of the present invention wherein the vent valve 108 can be pre-assembled, calibrated, and furnished as a kit for installation on various airbag modules. The cantilever spring 110 of the vent valve 108 and the mounting of the cantilver spring on the valve base 112 of the vent valve 108 is like the vent valve 40 of FIG. 2. The valve base 112 is like to the valve base 48, shown in FIGS. 2 and 3, of the vent valve 40, except for an extension 114 which has an integral pair of lugs 116 for mounting an actuating cam 118. This arrangement is further clarified by the exploded view in FIG. 6B, which shows the relationship and method of mounting the actuating cam 118 the valve base 112. A cam shaft 120 passes through a tubular section 121 of the actuating cam 118 and aligned holes 122 in the mounting lugs 116 to pivotally secure the actuating cam 118 to the valve base 112. The cam shaft 120 has a small flattened portion 124 which, when assembled, matches the location of a threaded hole 126 in the actuating cam 118. At assembly, a set screw 128 is tightened firmly against the flat area 124, so that input torque from the actuating mechanism or arm 130 will reliably rotate the cam 118.

The vent valves of the present invention, as previously described, can either be manufactured and assembled to airbag modules, or furnished as kits independent of airbag systems and module design and manufacture. Depending on the airbag system manufacturer's requirements, kit parts can be identified and furnished as a bag of loose parts or pre-assembled, as discussed above. Numerous variables may be considered and incorporated into the kits depending on the user's needs. For example, vent valves may be designed for bolting, riveting, crimping, clamping, or welding to the airbag module. Actuating methods and mechanisms may vary also depending on specific intended installations. Pre-set venting pressure ranges, and even vent port sizes, may also vary depending on specific system requirements.

Figure 7:
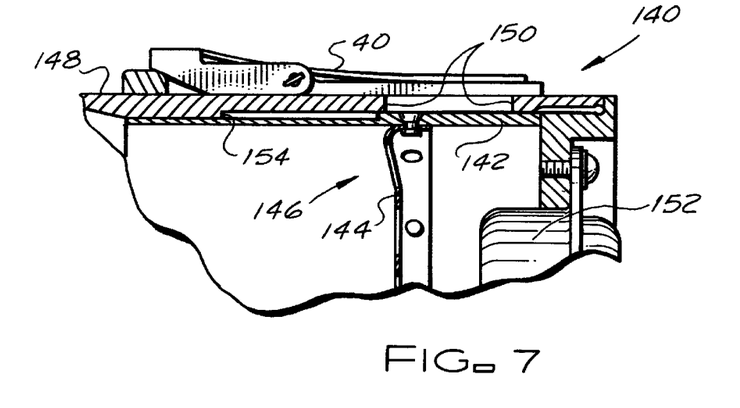
FIG. 7 shows a mechanism for blocking the vent ports during the initial pressure spike phase of airbag deployment.

FIG. 7 shows another mechanism 140 to increase the efficiency of the vent valve system of the present invention. When an airbag deploys, an initial pressure spike occurs. This is caused by a resisting force imposed by the module cover, by the inertia of the airbag fabric, and by any resistance to unfolding. Some locking of the folds also occurs as parts of the airbag inflate (gas fails to pass through the folds and pressure in the inflated section of the airbag pinches the folds tighter). Since the vent valves of the present invention have a very short response time, the vent valves will briefly open as this pressure pulse occurs. This brief opening and associated leakage is acceptable for most applications, but an optimum design would minimize or eliminate this opening. Doing so will conserve gas, and minimize the required size and weight of the inflator. The mechanism 140 includes a sleeve 142, a tubular part with a circular or generally circular transverse cross section, which is permanently attached to an airbag retainer 144 to form a sliding canister 146. The sliding canister 146 holds a portion of the airbag fabric which is folded and packed within the sliding canister 146. The remainder of the airbag (not shown) is packed in an extended portion of the housing 148, and is held in place by the module cover (not shown). The sliding canister 146 is shown in its pre-inflated position with the sleeve 142 completely covering a vent port 150. The airbag retainer 144 of the sliding canister is located a short distance from the inflator 152 to prevent intimate contact between the airbag fabric and the inflator 152, and to provide some initial volume for the gases from the inflator. During the inflation cycle, initial pressure is confined to the initial volume surrounding the inflator 152. This pressure acts upon the entire cross section area of the sliding canister 146 (and the packed airbag), and forces everything toward the exit of the airbag module (toward the left as shown in FIG. 7). As this motion proceeds, the airbag fabric will be compressed slightly, and the cover will be forced open. Then, as the initial pressure spike subsides, further movement of the sliding canister 146 uncovers vent ports 150, allowing the vent valves of the present invention, such as but not limited to the vent valve 40 shown in FIG. 7, to control vent flow of inflation gases. When the vent ports 150 are fully open, the canister 146 stops against shoulder 154, and the airbag continues to deploy. Even though the vent ports 150 are initially closed, the vent valves 40 can still protect against a severe OOPS (occupant very close to the airbag module) because the canister motion required to open the vent valves is very short. Also, if the airbag were to strike an occupant during the very early stage of deployment, the inflation gases only act on an effective area equal to the cross section of the housing bore. The resulting force is much less than if the airbag were partially inflated, thus minimizing potential injury to the occupant. Even though this pressure blocking arrangement is described relative to a round airbag housing, the same principle may be applied to square or rectangular modules. All that is necessary is to provide a sliding canister, similar to the canister 146, just inside the module housing that conforms to the interior transverse cross section of the module housing.

Figure 8A:
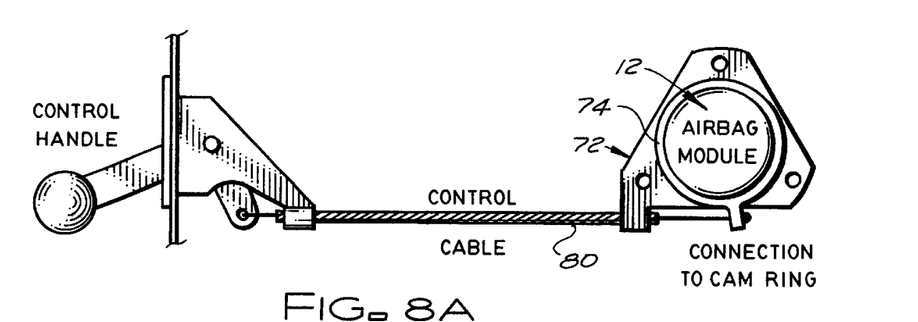
FIG. 8A is a schematic diagram representing a system using a manual adjustment.
Figure 8B:
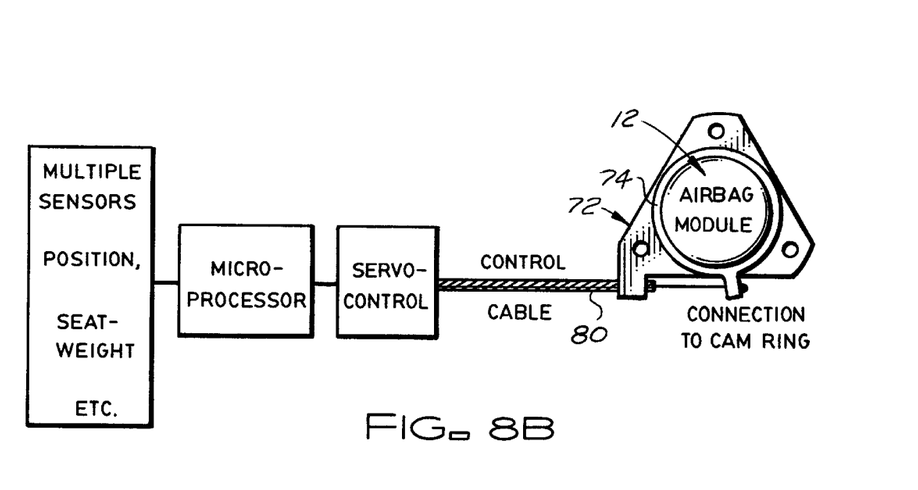
FIG. 8B is a schematic diagram of a system having an automatic (sensor controlled) adjustment.

FIGS. 8A and 8B are schematic diagrams to illustrate possible system arrangements, the first with a manual control, the latter with a sensor/servo control. Even though round airbag modules with cam rings are indicated, there are many other possible system arrangements and variations that could be designed by anyone of ordinary skill in the art once that person has read this specification.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A vent valve assembly for controlling the release of airbag inflation gases in an energy absorbing airbag system to maintain inflation gas pressure within an airbag at a substantially constant pressure during a ride-down of an energy absorbing event, comprising:

a cantilever spring that is flat or substantially flat in an unstressed condition and has an upper major surface and a lower major surface; the cantilever spring having a first end and a second free end portion;

means for securing the cantilever spring to an exterior surface of an airbag housing and flexing the cantilever spring to cause the second free end portion of the cantilever spring to be pressed, with a preset force, against an exterior vent port surface, that completely surrounds and defines an exterior periphery of an airbag housing vent port, to cover and seal the vent port until inflation gas pressure within an airbag housed within the airbag housing reaches a preselected value determined by the preset force whereupon the second free end portion of the cantilever spring is lifted from the vent port by the gas pressure exerted on the second free end portion of the cantilever spring by the inflation gases within the airbag to vent the inflation gases from within the airbag; and the resilience of the cantilever spring maintaining a substantially constant pressure within the airbag during a ride-down portion of an energy absorbing event: by causing the cantilever spring to vent gases at a rate generally proportional to pressure exerted on the free end of the cantilever spring by the inflation gases within the airbag to vent the inflation gases more quickly as the pressure of the inflation gases within the airbag increases above the preselected value during a ride-down portion of an energy absorbing event and to vent gases less quickly as the pressure of the inflation gases within the airbag above the preselected value decreases during a ride-down portion of an energy absorbing event; by causing the cantilever spring to close and seal the vent port whenever the pressure of the inflation gases within the airbag drops below the preselected value during a ride-down portion of an energy absorbing event; and by causing the cantilever spring to reopen and vent inflation gases from the vent port whenever the pressure of the inflation gases within the airbag again exceeds the preselected value during a ride-down portion of an energy absorbing event.

2. The vent valve assembly according to claim 1, wherein: the means for securing and flexing the cantilever spring is a mounting block for securing the cantilever spring to an airbag housing; the mounting block has a spring mounting surface to which a portion of the cantilever spring adjacent the first end of the cantilever spring is secured; the spring mounting surface is inclined relative to the exterior vent port surface of an airbag housing, when the mounting block in secured to the airbag housing, at an angle which causes the lower major surface of the cantilever spring to be inclined to the exterior vent port surface at an acute angle and to contact the vent port surface intermediate the mounting block and the vent port and which causes the cantilever spring to be flexed and pressed against the vent port surface with the preset force.

3. The vent valve assembly according to claim 2, wherein: the means for securing and flexing the cantilever spring includes flexure adjusting means for adjusting the flexure of the cantilever spring and the preset force with which the second free end portion of the cantilever spring is pressed against the exterior vent port surface to cover and seal the vent port.

4. The vent valve assembly according to claim 3, wherein: the flexure adjusting means for adjusting the flexure of the cantilever spring and the preset force with which the second free end portion of the cantilever spring is pressed against the exterior vent port surface to cover and seal the vent port is an adjustable force exerting means which can be adjusted to exert a selected downward force on the upper major surface of the cantilever spring intermediate the spring mounting surface of the mounting block and the free end portion of the cantilever spring.

5. The vent valve assembly according to claim 1, wherein: the means for securing and flexing the cantilever spring includes flexure adjusting means for adjusting the flexure of the cantilever spring and the preset force with which the second free end portion of the cantilever spring is pressed against the exterior vent port surface to cover and seal the vent port.

6. The vent valve assembly according to claim 1, wherein: the cantilever spring has a longitudinal center line extending from the first end of the cantilever spring to the second end portion of the cantilever spring; the means for securing and flexing the cantilever spring includes a pivot mounting means depending from the cantilever spring for pivotally mounting the cantilever spring intermediate the first end of the cantilever spring and the second end portion of the cantilever spring and for allowing the cantilever spring to pivot about an axis which extends generally perpendicular to the longitudinal centerline and generally parallel to the major surfaces of the cantilever spring; and the means for securing and flexing the cantilever spring includes flexure adjusting means for adjusting the flexure of the cantilever spring and the preset force with which the second free end portion of the cantilever spring is pressed against the exterior vent port surface to cover and seal the vent port.

7. The vent valve assembly according to claim 6, wherein: the flexure adjusting means for adjusting the flexure of the cantilever spring and the preset force with which the second free end portion of the cantilever spring is pressed against the exterior vent port surface to cover and seal the vent port is an adjustable force exerting means which can be adjusted to exert a selected upward force on the lower major surface of the cantilever spring intermediate the pivot axis and the first end of the cantilever spring.

8. The vent valve assembly according to claim 6, wherein: the flexure adjusting means for adjusting the flexure of the cantilever spring and the preset force with which the second free end portion of the cantilever spring is pressed against the exterior vent port surface to cover and seal the vent port is an adjustable force exerting means which can be adjusted to exert a selected downward force on the upper major surface of the cantilever spring intermediate the pivot axis and the free end portion of the cantilever spring.

9. The vent valve assembly according to claim 1, wherein: the means for securing the cantilever spring to the airbag housing is adapted to form the exterior vent port surface of the airbag housing.

10. A vent valve assembly for controlling the release of airbag inflation gases in an energy absorbing airbag system to maintain inflation gas pressure within an airbag at a substantially constant pressure during a ride-down of an energy absorbing event, comprising:

a cantilever spring that is flat or substantially flat in an unstressed condition and has an upper major surface and a lower major surface; the cantilever spring having a first end and a second free end portion;

means for securing the cantilever spring to an exterior surface of an airbag housing and flexing the cantilever spring to cause the second free end portion of the cantilever spring to be pressed, with a preset force, against a closure means for sealing an exterior vent port surface, that completely surrounds and defines an exterior periphery of an airbag housing vent port, to cover and seal the vent port until inflation gas pressure within an airbag housed within the airbag housing reaches a preselected value determined by the preset force whereupon the closure means and the second free end portion of the cantilever spring are lifted from the vent port by the gas pressure exerted on the second free end portion of the cantilever spring through the closure means by the inflation gases within the airbag to vent the inflation gases from within the airbag; and the resilience of the cantilever spring maintaining a substantially constant pressure within the airbag during a ride-down portion of an energy absorbing event: by causing the cantilever spring and closure means to vent gases at a rate generally proportional to the pressure exerted on the free end of the cantilever spring, through the closure means, by the inflation gases within the airbag to vent the inflation gases more quickly as the pressure of the inflation gases within the airbag increases above the preselected value during a ride-down portion of an energy absorbing event and to vent the inflation gases less quickly as the pressure of the inflation gases within the airbag decreases above the preselected value during a ride-down portion of an energy absorbing event; by causing the cantilever spring, through the closure means to close and seal the vent port whenever the pressure of the inflation gases within the airbag drops below the preselected value during a ride-down portion of an energy absorbing event; and by causing the cantilever spring, through the closure means, to reopen and vent inflation gases from the vent port whenever the pressure of the inflation gases within the airbag again exceeds the preselected value during a ride-down portion of an energy absorbing event.

11. The vent valve assembly according to claim 10, wherein:

the means for securing the cantilever spring to the airbag housing is adapted to form the exterior vent port surface of the airbag housing.

12. An energy absorbing airbag system with a vent valve assembly for controlling the release of airbag inflation gases to maintain inflation gas pressure within an airbag at a substantially constant pressure during a ride-down of an energy absorbing event, comprising:

an airbag housing for housing an inflatable airbag;

a vent valve assembly including a cantilever spring that is flat or substantially flat in an unstressed condition and has an upper major surface and a lower major surface; the cantilever spring having a first end and a second free end portion;

means securing the cantilever spring to an exterior surface of the airbag housing and flexing the cantilever spring to cause the second free end portion of the cantilever spring to be pressed, with a preset force, against an exterior vent port surface, that completely surrounds and defines an exterior periphery of an airbag housing vent port, to cover and seal the vent port until inflation gas pressure within the airbag housed within the airbag housing reaches a preselected value determined by the preset force whereupon the second free end portion of the cantilever spring is lifted from the vent port by the gas pressure exerted on the second free end portion of the cantilever spring by the inflation gases within the airbag to vent the inflation gases from within the airbag; and the resilience of the cantilever spring maintaining a substantially constant pressure within the airbag during a ride-down portion of an energy absorbing event: by causing the cantilever spring to vent gases at a rate generally proportional to the pressure exerted on the free end of the cantilever spring by the inflation gases within the airbag to vent the inflation gases more quickly as the pressure of the inflation gases within the airbag increases above the preselected value during a ride-down portion of an energy absorbing event and to vent gases less quickly as the pressure of the inflation gases within the airbag above the preselected value decreases during a ride-down portion of an energy absorbing event; by causing the cantilever spring to close and seal the vent port whenever the pressure of the inflation gases within the airbag drops below the preselected value during a ride-down portion of an energy absorbing event; and by causing the cantilever spring to reopen and vent inflation gases from the vent port whenever the pressure of the inflation gases within the airbag again exceeds the preselected value during a ride-down portion of an energy absorbing event.

13. The energy absorbing airbag system according to claim 12, wherein:

the means for securing and flexing the cantilever spring is a mounting block securing the cantilever spring to the airbag housing; the mounting block has a spring mounting surface to which a portion of the cantilever spring adjacent the first end of the cantilever spring is secured; the spring mounting surface is inclined relative to the exterior vent port surface of the airbag housing at an angle which causes the lower major surface of the cantilever spring to be inclined to the exterior vent port surface at an acute angle and to contact the vent port surface intermediate the mounting block and the vent port and which causes the cantilever spring to be flexed and pressed against the vent port surface with the preset force.

14. The energy absorbing airbag system according to claim 13, wherein:

the means for securing and flexing the cantilever spring includes flexure adjusting means for adjusting the flexure of the cantilever spring and the preset force with which the second free end portion of the cantilever spring is pressed against the exterior vent port surface to cover and seal the vent port.

15. The energy absorbing airbag system according to claim 14, wherein:

the flexure adjusting means for adjusting the flexure of the cantilever spring and the preset force with which the second free end portion of the cantilever spring is pressed against the exterior vent port surface to cover and seal the vent port is an adjustable force exerting means which can be adjusted to exert a selected downward force on the upper major surface of the cantilever spring intermediate the spring mounting surface of the mounting block and the free end portion of the cantilever spring.

16. The energy absorbing airbag system according to claim 12, wherein:

the means for securing and flexing the cantilever spring includes flexure adjusting means for adjusting the flexure of the cantilever spring and the preset force with which the second free end portion of the cantilever spring is pressed against the exterior vent port surface to cover and seal the vent port.

17. The energy absorbing airbag system according to claim 12, wherein:

the cantilever spring has a longitudinal center line extending from the first end of the cantilever spring to the second end portion of the cantilever spring; the means for securing and flexing the cantilever spring includes a pivot mounting means depending from the cantilever spring for pivotally mounting the cantilever spring intermediate the first end of the cantilever spring and the second end portion of the cantilever spring and for allowing the cantilever spring to pivot about an axis which extends generally perpendicular to the longitudinal centerline and generally parallel to the major surfaces of the cantilever spring; and the means for securing and flexing the cantilever spring includes flexure adjusting means for adjusting the flexure of the cantilever spring and the preset force with which the second free end portion of the cantilever spring is pressed against the exterior vent port surface to cover and seal the vent port.

18. The energy absorbing airbag system according to claim 17, wherein:

the flexure adjusting means for adjusting the flexure of the cantilever spring and the preset force with which the second free end portion of the cantilever spring is pressed against the exterior vent port surface to cover and seal the vent port is an adjustable force exerting means which can be adjusted to exert a selected upward force on the lower major surface of the cantilever spring intermediate the pivot axis and the first end of the cantilever spring.

19. The energy absorbing airbag system according to claim 17, wherein:

the flexure adjusting means for adjusting the flexure of the cantilever spring and the preset force with which the second free end portion of the cantilever spring is pressed against the exterior vent port surface to cover and seal the vent port is an adjustable force exerting means which can be adjusted to exert a selected downward force on the upper major surface of the cantilever spring intermediate the pivot axis and the free end portion of the cantilever spring.

20. The energy absorbing airbag system according to claim 12, wherein:

the exterior vent port surface of the airbag housing is formed by a portion of the means securing the cantilever spring to the airbag housing.

21. The energy absorbing airbag system according to claim 12, wherein:

there are a plurality of vent valve assemblies secured to the airbag housing for controlling the release of airbag inflation gases through a plurality of the airbag housing vent ports.

22. The energy absorbing airbag system according to claim 21, wherein:

internal vent closure means is included within the airbag housing for closing the vent ports to prevent the venting of inflation gases through the vent ports at the initiation of airbag inflation.

23. The energy absorbing airbag system according to claim 22, wherein:

the internal vent closure means is a canister that is slidably mounted within the airbag housing; the canister includes a sleeve portion slidably received within the airbag housing and an airbag retainer; and the sleeve portion of the canister has an outer surface, generally conforming in cross section to an interior surface of the airbag housing, that closes the vent ports until the canister is moved a preselected distance within the airbag housing by inflation gases.

24. An energy absorbing airbag system with a vent valve assembly for controlling the release of airbag inflation gases to maintain inflation gas pressure within an airbag at a substantially constant pressure during a ride-down of an energy absorbing event, comprising:

an airbag housing for housing an inflatable airbag;

a vent valve assembly including a cantilever spring that is flat or substantially flat in an unstressed condition and has an upper major surface and a lower major surface; the cantilever spring having a first end and a second free end portion;

means securing the cantilever spring to an exterior surface of the airbag housing and flexing the cantilever spring to cause the second free end portion of the cantilever spring to be pressed, with a preset force, against a closure means for sealing an exterior vent port surface, that completely surrounds and defines an exterior periphery of an airbag housing vent port, to cover and seal the vent port until inflation gas pressure within the airbag housed within the airbag housing reaches a preselected value determined by the preset force whereupon the closure means and the second free end portion of the cantilever spring are lifted from the vent port by the gas pressure exerted on the second free end portion of the cantilever spring through the closure means by the inflation gases within the airbag to vent the inflation gases from within the airbag; and the resilience of the cantilever spring maintaining a substantially constant pressure within the airbag during a ride-down portion of an energy absorbing event: by causing the cantilever spring and closure means to vent gases at a rate generally proportional to the pressure exerted on the free end of the cantilever spring, through the closure means, by the inflation gases within the airbag to vent the inflation gases more quickly as the pressure of the inflation gases within the airbag increases above the preselected value during a ride-down portion of an energy absorbing event and to vent gases less quickly as the pressure of the inflation gases within the airbag above the preselected value decreases during a ride-down portion of an energy absorbing event; by causing the cantilever spring, through the closure means, to close and seal the vent port whenever the pressure of the inflation gases within the airbag drops below the preselected value during a ride-down portion of an energy absorbing event; and by causing the cantilever spring, through the closure means, to reopen and vent inflation gases from the vent port whenever the pressure of the inflation gases within the airbag again exceeds the preselected value during a ride-down portion of an energy absorbing event.

25. The energy absorbing airbag system according to claim 24, wherein:

the exterior vent port surface of the airbag housing is formed by a portion of the means securing the cantilever spring to the airbag housing.

26. The energy absorbing airbag system according to claim 24, wherein:

there are a plurality of vent valve assemblies secured to the airbag housing for controlling the release of airbag inflation gases through a plurality of the airbag housing vent ports.

27. The energy absorbing airbag system according to claim 26, wherein:

internal vent closure means is included within the airbag housing for closing the vent ports to prevent the venting of inflation gases through the vent ports at the initiation of airbag inflation.

* * * * *